Patented Feb. 23, 1954

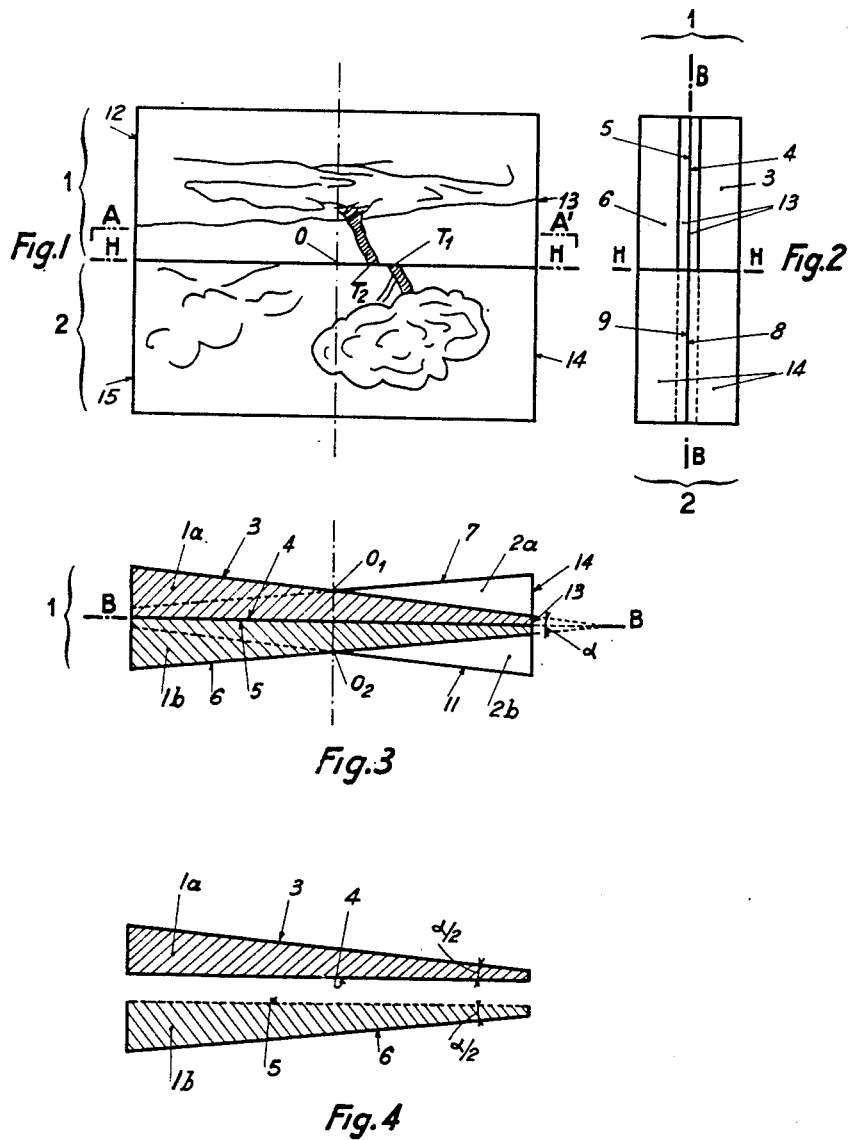

2,669,916

UNITED STATES PATENT OFFICE 2,669,916

TELEMETRIC FOCUSING DEVICE

Lucien Jules Emile André Dodin,
Canet-Plage, France

Application December 21, 1948, Serial No. 66,540

Claims priority, application France
September 22, 1948

1 Claim. (Cl. 95—44)

It is known to use two systems of suitably disposed refractive prisms for obtaining, in a photographic field, telemetric focusing coupled self-actingly with displacements of the object-glass. This way of doing, however, concerns only a limited portion of the photographic field.

It is further known to adjoin such prisms to a ground glass on which the whole image is observed, the focusing being effected by observing only that portion of said image in which the prisms are inserted. The edges of the prisms, seen in the field, are remote from the focusing plane, a fact which may make them appear dim or confused, if the image is examined with the aid of a powerful magnifying system.

The object of this invention is to provide a device of telemetric focusing which permits of doing away with the aforesaid shortcomings and is utilizable throughout the width of the field of the image contemplated, either in a viewfinder having its own object-glass whose displacements will be translated after reading or mechanically transmitted to the photographic object-glass itself, or so that the image produced by the picture taking object-glass may itself be utilized in a reflex type apparatus.

The focusing device proposed permits of keeping the advantage due to a surface ground within the entire field, while allowing for combined use of a field lens having, in comparison to the ground glass, advantages of greater luminosity.

It is, indeed, possible to entirely replace the ground glass by a field lens. However, in modern photographic and motion picture apparatus it should be possible to employ object-glasses having different focal distances, wherefore it should normally be necessary to provide for each focal distance employed a field lens of appropriate focus. With the device according to the present invention, having a glass very finely ground, it is possible to employ a field lens of medium power for the entire series of object-glasses utilized in the apparatus, the ground glass diffusing an amount of light sufficient to permit of well seeing the image whatever may be the focal distance of the object-glass employed.

The device according to this invention permits of obtaining these advantages with its dimensions remaining very small in thickness.

This device consists essentially of a semi-transparent ground surface arranged in the bisector plane common to two superimposed similar isosceles right prisms of deviation longitudinally inverted relative to each other and contacting each other in a plane passing through the optical axis, these prisms having their angles of deviation opposed to one another and the sides thereof crossing one another at points located on the optical axis, the assembly of the two prisms being such as to cover in projection the field of the image to obtain.

The semi-ground plane, blending with the bisector plane common to the said two prisms, is obtained by forming each prism with two similar prisms of half-angle subsequently joined together by their opposite sides of which at least one has been desirably burnished.

The invention will be more clearly understood by referring to the accompanying diagrammatic drawings in which:

Fig. 1 is an elevational rear view showing the ensemble of the prisms of deviation with an image, not focused, seen on the ground glass, said image being shown clear, but in reality it is somewhat dim, confused;

Fig. 2 is a side elevation corresponding to Fig. 1;

Fig. 3 is a sectional plan view taken on the line A—A' of Fig. 1; and

Fig. 4 shows two of the prismatic elements intended, when assembled, to form one of the deviation systems.

In these drawings similar characters of reference indicate like parts throughout the several views.

Denoted by reference 1 is the upper deviation prism constituted by two half-angle prisms 1a and 1b, while denoted by reference 2 is the lower prism identical with the prism 1 and constituted by two half-angle prisms 2a and 2b.

The prisms 1 and 2 are isosceles trapezium-like in cross-section, having their large bases denoted by references 12 and 14, respectively, while their small bases are denoted by references 13 and 15, respectively.

The prisms 1 and 2 are superimposed in the horizontal plane H—H passing through the optical axis O, and their faces corresponding to the bases 12, 15 and 13, 14 are situated, respectively, in the planes parallel to the optical axis O, their bisector planes blending with the plane B—B perpendicular to the said optical axis.

The inclined faces 3, 7 and 6, 11 of the two prisms cross each other, in projection upon the optical axis, at O1 and O2. The faces 4, 5 and 8, 9 of the prisms of angle $$\frac{a}{2}$$

are held in contact, two and two respectively, in the plane B—B.

The faces 5 and 9, for example of the prisms 1b and 2b, are finely ground, so as to be semi-transparent, and, while diffusing sufficient light in order that an image may be seen, are sufficiently transparent in order that the rays of light may traverse the prism and that the latter may play its telemetric role.

In this way has been materialized the aforesaid device of the present invention consisting of a ground surface arranged in the bisector plane common to two isosceles deviation prisms superimposed in suitable manner on each side of a diametral plane of the luminous field of the object-glass, said ground surface and prisms being so arranged as to cover the entire photographic field and permit, eventually in association with a sole field lens, framing and simultaneous focusing of the image through object-glasses having different focal distances.

However, when the set of interchangeable object-glasses is very extensive or when it is not possible, for example on account of space requirements, to utilize an auxiliary field lens strong enough to provide good light for the object-glasses with the shortest focal distance, it becomes necessary to provide a ground glass with sufficiently large grain whereby the image may be well seen in all cases. In these conditions, however, it may happen that the size of the grain be such as to prohibit a satisfactory telemetric focusing if the light is feeble.

In this case it is expedient to polish more finely a small circular area in the center of the ground surface. This may be readily accomplished with the aid of a small tool in the form of a mask constituted by a metal foil provided at its center with a circular hole of suitable diameter.

The ground surface is placed behind said mask upon which this surface may be temporarily affixed for example with the aid of an adhesive. This assembly is then subjected to the action of a rapidly rotating felt disc coated with polishing paste. The soft surface of the felt disc passes through the hole and comes to burnish the uncovered portion of the ground surface. The operation is stopped when the finely ground circular area suitable for the desired telemetric focusing is thus obtained.

Diagrammatically shown in Fig. 1 is the aspect of an image in the course of focusing. The tree trunk, upon which focusing has been made, is separated as at T1, T2. When T1 and T2 will be joined together, the focusing will be accomplished. Nevertheless, the whole image is seen owing to the aforesaid ground surface.

The latter may be obtained by any known means and must be fine, almost transparent to light.

Only one of the surfaces in contact may be ground, as hereinabove exemplified, or both surfaces may be ground.

The transparency may be increased by coating the ground surface with a very thin layer of Vaseline and then carefully wiping it away, the remaining traces of Vaseline being amply sufficient for greatly improving the transparency.

The prisms of angle $$\frac{a}{2}$$

joined together to form the prisms of angle $a$ may be placed merely in contact with each other, without interposition of any adhesive for example.

In this case there is an air gap between the two surfaces in contact, wherefore the state of the ground surface or surfaces may happen to be such as to cause too great a decrease in the transparency. The latter may be increased, without suppressing the ground surface, by interposing between the two faces, in lieu of the air gap, a material having its index of refraction greater than 1 but inferior to the index of the ground glass. There may also be employed a material of index clearly greater than that of the ground glass. The best way of doing this will be to utilize such material as an adhesive for causing the opposite lying faces to adhere to each other.

When it would be desired to employ a material having the index of the glass of one of the two joined half-angle prisms, there would be used a glass of greater index for the other half-angle prism and it is the contact face of the latter that would then alone be ground.

As a less refractive material, there may be employed, for example, gelatine, more particularly fish-glue containing a sufficient amount of water in order that its index be not very far from the index of the water, that is to say considerably far from that of the glass.

Also, said gelatine may be combined with products usually employed for rendering it particularly hygrometric.

What is claimed is:

In a telemetric focusing device of the type described the improvement comprising in combination two superimposed wedgelike isosceles deviation prisms facing with their edges in opposite direction, contacting each other in a plane passing through the optical axis of the device, and at least practically covering the entire image to be formed; each of said prisms being composed of two half-angle prisms of the same index of refraction contacting each other in a plane perpendicular to said optical axis; at least one of the contacting surfaces in each pair of said half-angle prisms being ground to semitransparency and provided with a polished central portion; and an adhesive material uniting each pair of said half-angle prisms and having an index of refraction different from that of said prisms.

LUCIEN JULES EMILE ANDRÉ DODIN.

References Cited in the file of this patent

UNITED STATES PATENTS

| Number | Name | Date |
|---|---|---|
| 886,739 | Thorner | May 5, 1908 |
| 2,341,410 | Mihalyi | Feb. 8, 1944 |
| 2,526,204 | Dodin | Oct. 17, 1950 |
| 2,569,516 | Corsi et al. | Oct. 2, 1951 |